United States Patent
Braun et al.

(10) Patent No.: US 10,253,399 B2
(45) Date of Patent: Apr. 9, 2019

(54) METHOD FOR PRODUCING AN ENERGY-STORING CONTAINER MADE OF LIGHTWEIGHT STEEL

(71) Applicant: Salzgitter Flachstahl GmbH, Salzgitter (DE)

(72) Inventors: Michael Braun, Lehre (DE); Manuel Otto, Cremlingen (DE); Zacharias Georgeou, Wolfsburg (DE); Bianca Springub, Hannover (DE)

(73) Assignee: SALZGITTER FLACHSTAHL GMBH, Salzgitter (DE)

( * ) Notice: Subject to any disclaimer, the term of this patent is extended or adjusted under 35 U.S.C. 154(b) by 122 days.

(21) Appl. No.: 15/003,503

(22) Filed: Jan. 21, 2016

(65) Prior Publication Data

US 2016/0138146 A1 May 19, 2016

Related U.S. Application Data

(63) Continuation of application No. 13/989,544, filed as application No. PCT/DE2011/001943 on Oct. 28, 2011, now abandoned.

(30) Foreign Application Priority Data

Nov. 26, 2010 (DE) .................. 10 2010 053 153
Oct. 24, 2011 (DE) .................. 10 2011 117 135

(51) Int. Cl.
| | |
|---|---|
| *C22C 38/38* | (2006.01) |
| *C22C 38/58* | (2006.01) |
| *C22C 38/02* | (2006.01) |
| *C22C 38/04* | (2006.01) |
| *C22C 38/06* | (2006.01) |
| *C22C 38/34* | (2006.01) |
| *B60K 15/03* | (2006.01) |
| *C22C 38/00* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/52* | (2006.01) |
| *C22C 38/54* | (2006.01) |
| *C22C 38/56* | (2006.01) |

(52) U.S. Cl.
CPC ........ *C22C 38/58* (2013.01); *B60K 15/03006* (2013.01); *C22C 38/001* (2013.01); *C22C 38/002* (2013.01); *C22C 38/02* (2013.01); *C22C 38/06* (2013.01); *C22C 38/34* (2013.01); *C22C 38/38* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/56* (2013.01)

(58) Field of Classification Search
None
See application file for complete search history.

(56) References Cited

U.S. PATENT DOCUMENTS

| | | |
|---|---|---|
| 4,865,662 A | 9/1989 | Zimmer et al. |
| 4,975,335 A | 12/1990 | Wan |
| 2007/0125454 A1* | 6/2007 | Eipper .............. C22C 38/002 148/329 |
| 2009/0196785 A1* | 8/2009 | Spitzer .............. C21D 6/005 420/72 |

FOREIGN PATENT DOCUMENTS

| | | | |
|---|---|---|---|
| DE | 19900199 | | 7/2000 |
| DE | 102005016492 | | 10/2006 |
| DE | 102005062221 | | 5/2007 |
| DE | 102005057599 | | 6/2007 |
| EP | 0489727 | | 8/1995 |
| EP | 0573641 | * | 9/1998 |
| EP | 2090668 | | 8/2009 |

* cited by examiner

*Primary Examiner* — Deborah Yee

(74) *Attorney, Agent, or Firm* — Henry M. Feiereisen LLC

(57) ABSTRACT

An energy-storing container is made of a lightweight steel having the following chemical composition (in wt %): C 0.04-2%; Mn 14-30%; Al 1.5-12%; Si 0.3-3%; Cr 0.12-6%, and additionally one or more of the following elements: Ti, V, Nb, B, Zr, Mo, Ni, Cu, W, Co, P, N, each at up to 5% and in total at up to 10%, wherein the remainder is Fe including common steel tramp elements, wherein the concrete alloy composition is selected in order to limit the α'-martensite fraction before or after a forming process to no more than 3%, with the stipulation that the α'-martensite equivalent according to 0.1*wt % Mn+wt % C+0.05*wt % Si is between 3.4 and 10.5.

6 Claims, No Drawings

METHOD FOR PRODUCING AN ENERGY-STORING CONTAINER MADE OF LIGHTWEIGHT STEEL

CROSS-REFERENCES TO RELATED APPLICATIONS

This application is a continuation of prior filed U.S. application Ser. No. 13/989,544, filed May 24, 2013 now abandoned which is the National Stage of International Application No. PCT/DE2011/001943, filed Oct. 28, 2011.

This application claims the priority of German Patent Application, Serial No. 10 2010 053 153.7, filed Nov. 26, 2010, and Serial No. 10 2011 117 135.9, filed Oct. 24, 2011, pursuant to 35 U.S.C. 119(a)-(d), the disclosure of which is incorporated herein by reference.

BACKGROUND OF THE INVENTION

The invention relates to an energy-storing container made of lightweight steel, in particular for motor vehicles, according to the preamble of claim 1.

Such containers store for example liquids such as gasoline, diesel, liquid gas or gaseous energy carriers such as hydrogen, have to meet high safety standards in particular during mobile use, for example in tank trucks, automobiles, ships but also as energy resource in satellites or space ships.

Although the invention is described in particular in the context of the field of energy-storing containers, the lightweight steel is not limited to this field but can of course also be used for other fields of application, for example in automobile construction, machine construction or steel construction.

Especially the hotly contested automobile market forces manufacturers to constantly seek solutions for lowering fleet consumption while at the same time maintaining the highest possible comfort and occupant safety. On one hand, the weight saving for all vehicle components plays an important role, on the other hand however, also properties of the individual components to passively increase safety of the passengers at high static and dynamic stresses during operation and in the case of a crash. Further, these containers often have a very complex structure in order to use the available installation space as efficiently as possible which increases the tank volume.

Energy-storing containers made of steel, for example tanks for motor vehicles are known inter alia from DE 10 2005 0 16 492 A1. In order to save weight, the containers are manufactured from steel with increased strength, so that the wall thickness can be reduced. In the here mentioned higher strength steel types, there is a risk, for example when storing hydrogen or hydrogen containing gases at low temperatures, of hydrogen-induced stress cracks or hydrogen embrittlement, which in case of a crash results in the risk that the container breaks and the leaking medium can cause significant damage.

The invention is based on the object to provide a light construction steel for use for energy-storing containers which in case of a crash has a high ductility and prevents hydrogen induced stress cracks or a hydrogen embrittlement of the component. This object is solved by a lightweight steel according to the main claim.

SUMMARY AND DETAILED DESCRIPTION OF THE INVENTION

According to the teaching of the invention, a lightweight steel is used for an energy-storing container having the following chemical composition (in wt %):

C 0.04-2%
Mn 14-30%
Al 1.5-12%
Si 0.3%-3%
Cr 0.12-6%
And additionally one or more of the elements:
Ti, V, Nb, B, Zr, Mo, Ni, Cu, W, Co, P, N each of up to 5% and in total up to 10%, wherein the remainder is Fe including common steel tramp elements, and wherein the concrete alloy composition for limiting the α'-martensite-proportion before or after a deformation to maximally 3% is selected with the stipulation that the α'-martensite equivalent according to $$0.1*wt\% \ Mn + wt\% \ C + 0.5*wt\% \ Al + 0.05*wt\% \ Si$$
is between 3.4 and 10.5.

In recent years, significant progress has been made in the field of the so-called lightweight steels which are characterized by a low specific weight and high strength and tenacity (for example EP 048-9727 B1, EP 0573641B1, DE 199-001-9981) as well as a high ductility and are therefore of great interest for the vehicle construction.

In these steels which are austenitic in their initial state, a weight reduction that is advantageous for the automobile industry while maintaining the conventional way of construction is achieved by the high proportion of alloy components with a specific weight far below the specific weight of iron (Mn, Si, Al).

These known lightweight steels have a partially stabilized γ-mixed crystal microstructure with defined stacking fault energy with an in some cases multiple TRIP-(Transformation Induced Plasticity) effect, which . . . the tension- or stretch induced transformation of a surface centered γ-mixed crystal (austenite) into an ε-martensite (hexagonal densest spherical packing) which then transforms into a body-centered α'-martensite and residual austenite during further deformation.

The high degree of deformation is achieved by TRIP-, TWIP (Twinning Induced Plasticity) and SIP (Shear band Induced Plasticity) properties of the steel.

Tests have shown, that low alloy, conventional TRIP steels as well as high alloy TRIP-steels with low Al content due to their microstructure and chemical composition have a tendency for hydrogen embrittlement which prevents the use as lightweight steel for energy storing containers. When internal stresses in the material are present, a delayed embrittlement triggered by hydrogen and as a result crack formation can occur depending on the microstructure and the strength.

Tests with steals with TRIP-effect have surprisingly shown, that the proportion of α'-martensite in this steel has a significant influence on the susceptibility for hydrogen embrittlement. Negative effects are no longer detected in case of a limitation to a maximum content of 3%.

On one hand, the formation of α'-martensite is influenced by the concrete alloy composition of the light construction steel, on the other hand also by a deformation that may act on the steel sheet.

The alloy composition should be selected, so that an austenite phase which is as stable as possible is present in the steel. In the case of lightweight steels, that have a strong metastable austenite phase, the metastable austenite transforms due to imposed mechanical tensions into the α'-martensite (TRIP-effect) which is deleterious for the described application.

Depending on the alloy composition, occurrence of the TRIP-effects results in the formation of the α'-martensite phase partly via the metastable α'-martensite phase. In regions, in which the material is for example deformed under compression stress, the more densely packed α'-martensite phase can be present also after the deformation according to the principle of the smallest resistance and transform into the α'-martensite phase after release of stress.

In this folding of the α-martensite phase into the α'-martensite phase, the hydrogen has to be released due to the lower solubility and either leads atomically or recombined to the weakening of the material, or as the case may be to cracks.

Starting from an alloy with C and Mn, the addition of Al and/or Si leads to a destabilization of the α'-martensite phase. This lowers the risk of a hydrogen embrittlement or increases the leeway for the steelworker to categorize the cast melt still as tolerable even when exceeding the maximal value of the hydrogen. Fewer negative evaluations increase the output and with this the cost effectiveness of the method.

Independent of the effect of the addition of Al and/or Si the carbon content is an important element in the proposed alloy concept because it stabilizes the austenite phase and displaces the hydrogen from the free lattice positions.

For example, alloys with
0.7% C, 15% Mn, 2.5% Al, 2.5% Si, 0.12% Cr
0.4% C, 18% Mn, 2.5% Al, 2.5% Si, 0.12% Cr and
1.0% C, 22% Mn, 9% Al, 0.6% Si, 0.12% Cr
beside excellent mechanical properties have no or only a very small proportion of α'-martensite and are therefore very well suited for energy-storing containers in particular hydrogen tanks.

In tests with deep drawn cup under corrosive stress, the alloy according to the invention had a high resistance against hydrogen-induced stress corrosion, that was significantly higher than in α'-martensite containing TRIP-steels under comparable conditions (strength, medium, state of stress . . . )

The alloy according to the invention is thus excellently suited for use for example for containers for storing of hydrogen, but also for other hydrogen or sulfuric hydrogen containing media.

A further advantage compared to lightweight steels with α'-martensite results in the case of overstress for example as a result of increased operating pressure or crash. Steels with the alloy composition according to the invention with a maximal proportion of α'-martensite of 3% due to the then prevailing TWIP-/SIP strengthening behavior can absorb a higher energy level compared to TRIP-steels before component failure occurs.

The aforementioned properties of this lightweight steel according to the invention therefore predestine it for energy-storing containers which are transported for example in motor vehicles, tankers, ships or also in satellites.

By adding further alloy elements such as Ti, V, Nb, B, Zr, Mo, Ni, Cu, W, Co, P, N with contents of up to 5% and in total up to 10% material-specific properties can be adjusted in a targeted manner additionally. For example, beside an increased addition of Al of up to 12%, adding Co, Mo or V causes an increase of the high-temperature strength.

A higher high-temperature strength is for example advantageous at high temperature stress such as for example a fire, because the integrity of the container is maintained longer than in known α'-marteniste containing TRIP-steels.

A minimal content of chrome of 2% and maximum content of 6% has been proven advantageous with regard to corrosion resistance. When adding less than 2%, chrome has no significant influence on the corrosion resistance. A mixed crystal is formed and the chrome oxide layer responsible for the corrosion resistance cannot form. When adding chrome in excess of 6%, the brittle sigma-phase can form after a long service life. However, when only the ductility of the container is to be significantly increased, chrome is added to a content of 0.12 to <2%.

Further, complex container structures can advantageously be manufactured by forming from the lightweight steel according to the invention, having an elongation at break A80 of >40%.

A further improvement of the material properties with regard to a hydrogen embrittlement can be achieved in an advantageous refinement of the invention, when the alloy contents are maintained within the following limits: C 0.5-1.2%, Mn 14-22%, Al 6-10%, Si 0.3-3%, Cr <4% also limiting the proportion of α'-martensite.

A lightweight steel with this alloy composition has a so-called TRIPLEX-structure i.e., a three-phase microstructure is present. The kappa carbides which have a nano-dispersed distribution in the microstructure in TRIPLEX-steels, additionally cause a high resistance against hydrogen embrittlement.

What is claimed as new and desired to be protected by Letters Patent is set forth in the appended claims and includes equivalents of the elements recited therein:

What is claimed is:

1. A method of minimizing hydrogen embrittlement of a lightweight steel with the following chemical composition (in wt %):

C 0.04-2%
Mn 14-30%
Al 1.5-12%
Si 0.3-3%
Cr 0.12-6%,
one or more elements selected from Ti, V, Nb, B, Zr, Mo, Ni, Cu, W, Co, P, and N, each up to 5% and in total up to 10%, wherein the remainder is Fe including common steel tramp elements, said method comprising:
limiting a proportion of α'-martensite allowed in a lightweight steel to a maximum of 3% by calculating an α'-martensite equivalent according to the formula:

$$0.1*wt\% \text{ Mn} + \text{weight}\% \text{ C} + 0.5*wt\% \text{ Al} + 0.05*wt\% \text{ Si} \geq 3.6 \leq 10.5;$$

and
determining a Mn, Al, C and Si content in accordance with the calculated α'-martensite equivalent for formulation of the lightweight steel.

2. The method of claim 1, wherein the Cr content is in the range from 2 to 6%.

3. The method of claim 1, wherein the Cr content is in the range from 0.12 to <2%.

4. The method of claim 1, wherein the lightweight construction steel has a triplex structure with finely distributed kappa carbides and the following chemical composition (in wt %):

C 0.5-1.2%
Mn 14-22%
Al 6-10%
Si 0.3-3%
Cr <4%.

5. The method of claim 1, further comprising producing the energy storing container form the steel with the Mn, Al, C and Si content according to the calculated α'-martensite equivalent.

6. The method of claim 1, wherein the lightweight steel has an elongation at break A80 of >40% for producing complex structured containers by forming.

* * * * *